June 6, 1944.  C. R. BINGHAM  2,350,579

VEHICLE HITCH

Filed Sept. 25, 1942  3 Sheets-Sheet 1

Charles Russell Bingham, INVENTOR.

BY Bush & Bush,
his Attorneys.

June 6, 1944.  C. R. BINGHAM  2,350,579
VEHICLE HITCH
Filed Sept. 25, 1942  3 Sheets-Sheet 2
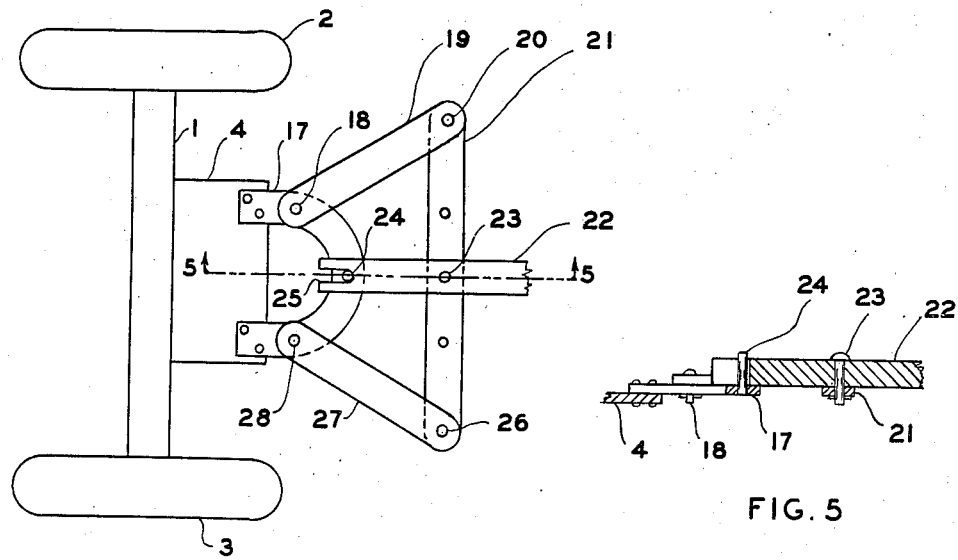
FIG. 3
FIG. 5
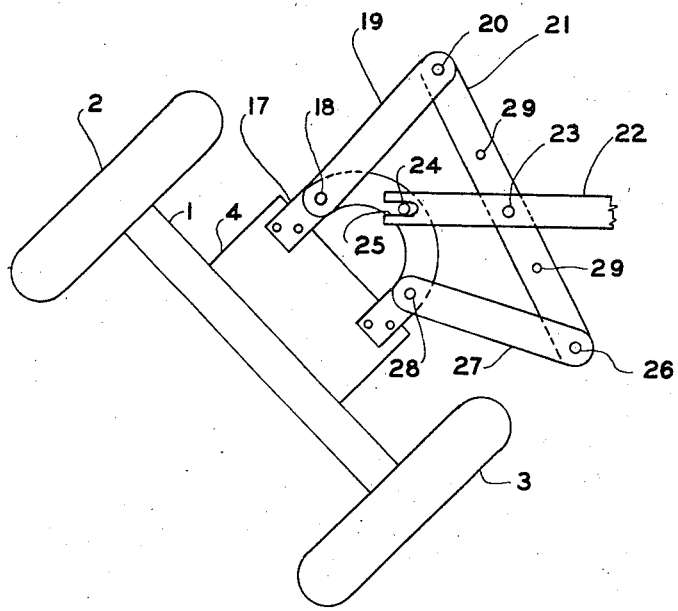
FIG. 4
Charles Russell Bingham, INVENTOR.
BY
his Attorneys.

June 6, 1944. C. R. BINGHAM 2,350,579
VEHICLE HITCH
Filed Sept. 25, 1942 3 Sheets-Sheet 3
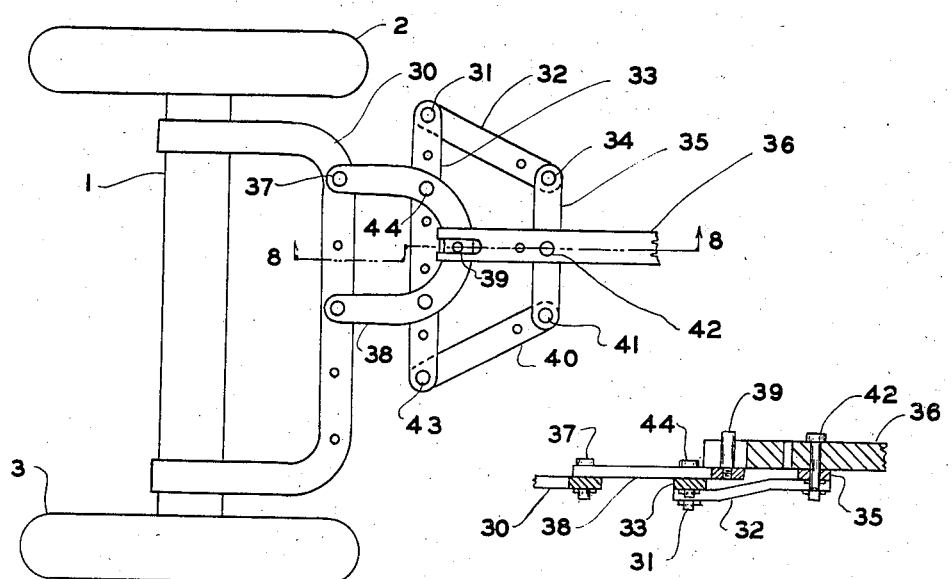
FIG. 6
FIG. 8
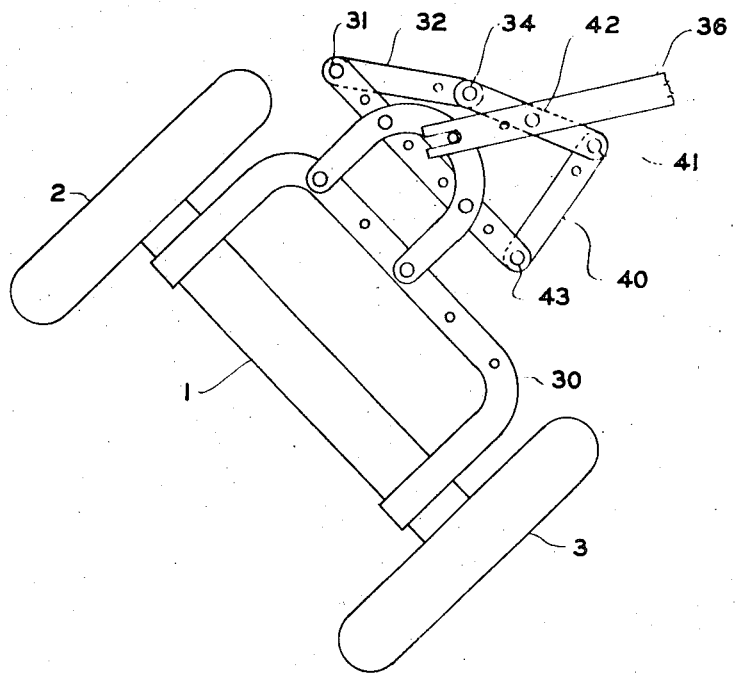
FIG. 7
Charles Russell Bingham INVENTOR.
BY
Bush & Bush
his Attorneys Patented June 6, 1944

2,350,579

UNITED STATES PATENT OFFICE 2,350,579

VEHICLE HITCH

Charles Russell Bingham, Davenport, Iowa

Application September 25, 1942, Serial No. 459,878

19 Claims. (Cl. 280—33.44)

My invention relates to improvements in vehicle hitches.

The objects of my invention are to provide a hitch which will increase the pull or tension upon the inner rear wheel of the tractor in making a turn and correspondingly diminish the pull or strain upon the outer rear wheel of the tractor in making such a turn, thus enabling the tractor to pull a heavier load in making a turn than it would otherwise be able to do; to provide such a hitch having means for adjusting the relative position of the trailer laterally of the tractor; to provide such an apparatus which will permit shorter turns and avoid contact of the hitch with the rear wheels of the tractor or the draw-plate or bar of the tractor; to provide a hitch which will permit lateral placement of the trailer with reference to the tractor and arrange the traction in such a way as to obviate a side draft upon the rear wheels which would cause the furrow wheel to climb upon the plowed ground; and to provide such a hitch which will permit the trailer to be hitched laterally toward either side of the tractor.

I accomplish these objects by the apparatus illustrated in the accompanying drawings, in which:

Figure 3 shows an alternative form of hitch in which greater clearance of the rear wheels is provided and the hitch is so arranged as to facilitate backing the tractor and trailer on a curve. In this view the trailer and tractor wheels are shown in the position occupied if both tractor and trailer were traveling in the same direction;

Figure 4 shows a view of the same hitch disclosed in Figure 3, but with the rear wheels of the tractor turned at an angle of approximately 45° from the previous line of travel of the tractor and trailer;

Figure 5 is a sectional detail on the line 5—5 of Figure 3;

Figure 6 shows an alternative form of hitch which may be utilized when it is necessary to have the trailer at one side of the center line of travel of the tractor, but shows parts as if both trailer and tractor were traveling in the same line;

Figure 7 shows the same hitch with the tractor wheels turned to an angle of 45° from the line of travel shown in Figure 6;

Figure 8 shows a sectional detail on the line 8—8 of Figure 6.

Similar numerals refer to similar parts throughout the several views.

Figure 1:
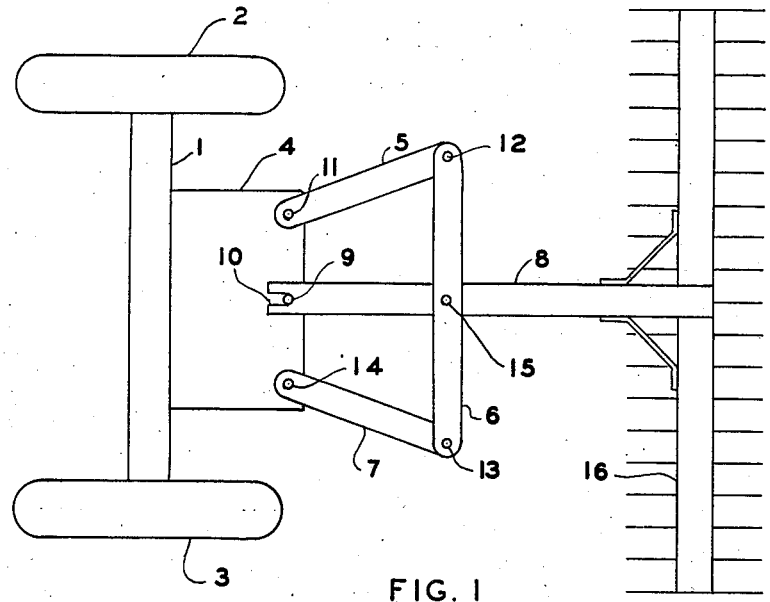
Figure 1 shows a preferred form of my hitch applied to the draw-plate attached to the rear axle of a tractor and to the tongue of a disc harrow traveling in the same direction.

In this application I use the term "tractor" to designate either a farm tractor or a road tractor and the word "trailer" to designate either a two or four-wheeled road trailer or plow, disc harrow, seeder or other agricultural implement or road-making machinery designed to be hauled by a tractor, and while my apparatus is designed primarily for use on tractors of the wheel type, it may also be applied to caterpillar tractors.

In the construction of tractors for pulling plows and other agricultural implements, as well as road-making machinery, it has been common practice to fasten a rigid draw-plate or draw-bar to the tractor frame or rear axle, projecting a considerable distance to the rear of the rear axle so as to permit the coupling or hitching apparatus by which the tractor is coupled to its trailer to clear the rear wheels of the tractor and to couple the tongue of the trailer to the draw-plate or drawbar of the tractor by a single pivoted coupling.

I have found that in the operation of tractor-drawn plows and other machinery and have noticed in the operation of tractor-drawn trailers and trucks, that while the ordinary form of rearwardly extending draw-plate or drawbar with the tongue of the trailer pivoted to the middle thereof, will permit turns to be made without the tongue contacting the rear wheels of the tractor, there is a tendency to put an undue pull or strain upon the outer wheel of the rear pair of wheels of the tractor that tends to cause it to dig in and impede progress or travel of the trailer.

It is obvious that in making an ordinary turn to the right or left so as to travel in a direction at right angles to the direction of travel from which the tractor is departing, the outer wheel— that is the wheel on the outside of the curve—will have to travel considerably farther than the inner wheel or the wheel on the inner side of the curve.

With the single pivot hitch heretofore in use, there is just as much pull or strain upon the outer wheel as upon the inner one.

I have found that as the inner wheel travels a relatively shorter distance than the outer wheel, if means are applied by which the tractive effort required of the inner wheel is increased in proportion to the increased distance which the outer wheel has to travel, the tractor will be able to pull its load around curves or right-angle turns much more readily and freely than where the tractive effort required of the two wheels is at all times the same regardless of the different distances they travel.

My apparatus is designed to take advantage of this discovery and I have arranged my hitch with a leverage which will throw a heavier pull or tractive effort upon the inner wheel of the tractor during the turning movement.

To accomplish this I utilize the rear axle 1 which may be the rear axle of any tractor in common use, and the draw-plate 4 of the form commonly in use in connection with such tractors, or a drawbar 30 as illustrated in Figure 6 may be utilized in place of the draw-plate 4. Both of these forms are in common use and I make no claim to either one of them separately.

I mount a crossbar 6 upon the tongue 8 of a disc harrow or other trailer by a pivot bolt 15 or other suitable pivot mounting. At the middle of the rear of the draw-plate 4 I prefer to secure a pivot bolt 9 which may be embraced by a slot or yoke 10 formed by slotting the front end of the tongue 8.

Sidebars 5 and 7 have their front ends secured by pivots 11 and 14 to the draw-plate 4 near the outer ends thereof and the other ends of the sidebars 5 and 7 are pivotally secured to the crossbar 6 by pivot bolts 12 and 13 or other suitable mounting.

The crossbar 6 is preferably made materially longer than the draw-plate 4. When so constructed, it is obvious that when the rear wheels of the tractor are turned into the position shown in Figure 2, the members of the hitch will move into the position shown in Figure 2 and when so moved, the line of greatest stress upon the hitch will be approximately along the line from the pivot 15 to the pivot 14, thereby throwing a greater pull upon the wheel 3 than there is upon the wheel 2, but as the wheel 3 will not have to travel so far in making this lefthand turn as the wheel 2 will, the total quantum of tractive effort required by the two wheels in completing the turn will be approximately equalized.

Figure 2:
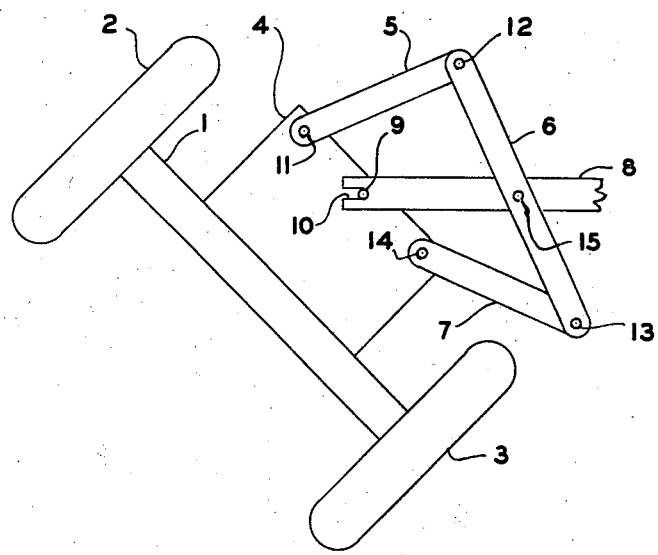
Figure 2 shows the same hitch after the tractor wheels have turned to an angle of approximately 45° to the direction of travel shown in Figure 1.

In this form of hitch, the use of the central pivot 9 embraced by the fork 10 is not essential to the successful operation of the hitch, but does facilitate the movement of the hitch as a whole into the position shown in Figure 2.

In Figure 3, in place of connecting the sidebars directly to the draw-plate 4, I have mounted a U-shaped draft-bar 17 rigidly upon the rear draft-plate 4 and pivoted the sidebars 19 and 27 thereto by pivots 18 and 28. The U-bar 17 is provided with a pivot bolt 24 which may be embraced by an elongated yoke or slot 25 formed in the end of the tongue 22 and the tongue 22 is pivotally mounted upon a crossbar 21 the ends of which are united to the rear ends of the sidebars 19 and 27 by pivots 20 and 26.

The pivot bolts 18 and 23 may be secured in place by keys extending through suitable openings in the lower ends thereof and the pivot 24 is preferably threaded or otherwise rigidly united to the U-bar 17.

In rounding a corner as shown in Figure 4, the greater part of the draft will be in the line between the pivots 23 and the pivots 28 so as to throw the greater strain upon the wheel 3 as heretofore described.

One advantage of the use of the U-bar described herein, is that it will facilitate backing up when it is desired to back the tractor and trailer without uncoupling them.

In the form shown in Figure 3, the slot 25 is elongated so as to permit coupling the tongue to one side of the middle of the bar 21 by inserting the pivot 23 in one of the holes 29 or 30 of the crossbar 21.

In Figure 6 I have shown a variation of my hitch designed to overcome difficulties which sometimes arise in heavy plowing. It is well recognized that two fourteen-inch plows are about all that can be pulled by the ordinary farm tractor and that in order to throw the ground moved by the plows over onto the adjoining plowed strip and furrow, it is necessary to couple the plows at one side of the tractor. It is also recognized that when so coupled, in case the plows run into heavy clay or exceptionally hard ground, the extremely heavy draft of the plow has a tendency to force the tractor laterally toward the land previously plowed and to cause the furrow wheel of the tractor to climb upon the plowed ground.

In order to obviate this tendency, my U-bar hitch may be applied as follows: the U-bar 38 may be rigidly secured to the draw-bar 30 of the tractor by rivets or bolts 37 at one side of the drawbar instead of in the middle thereof. A short crossbar 35 may be pivotally mounted upon the tongue which extends forward with a slot formed therein to embrace the pivot 39 which is secured at the middle of the U-bar. A longer crossbar 33 is rigidly united to the U-bar by rivets 44 and sidebars 32 and 40 have their front ends pivotally secured to the crossbar 33 by pivots 31 and 43 and their rear ends pivotally united to the short crossbar 35 by pivots 34 and 41.

When so constructed, if the side draft on the tractor causes it to swerve to the right, the hitch will swing to the left and throw an increased strain upon the wheel 3, thereby relieving the side pull upon the wheel 2 and straightening up the tractor and plow. A similar result will occur in making a turn to the left as shown in Figure 7 which will throw more of the strain upon the wheel 3 than it would be pulling if the tractor and plow were traveling straight ahead.

In this form of apparatus the sidebars 32 and 40 may be bent as shown in Figure 8 and the pivot bolts may be secured in place by keys or other suitable means. The form of hitch shown in Figures 6 and 7 is particularly applicable to plows, mowers, reapers, combines and road-grading machines where a heavy side draft is encountered.

Another advantage of my apparatus is that in case the trailer is drawn close to a fence corner where it would be difficult to make a sharp turn, the pivot 23 may be taken out and the crossbar 21 shoved over and the pivot replaced in the bore 30 so as to cause a sharper turn of the trailer.

It is obvious that various modifications of my apparatus may be made without departing from the spirit of my invention and I do not limit my claims to the precise forms shown in the drawings which are intended to be illustrative rather than as limiting the description.

My invention may also be applied to tractors used for artillery or any other purpose.

I claim:

1. A hitch for coupling tractors and trailers, comprising a draw-plate or drawbar rigidly united to the tractor at the rear end thereof, a pair of spaced sidebars having their front ends pivotally united to the draw-plate or bar at or near the rear corners thereof respectively, a crossbar having its ends pivotally united to the rear ends of the sidebars, and a tongue united to the trailer and pivotally united to the middle of the crossbar.

2. A hitch for coupling tractors and trailers, comprising a draw-plate or drawbar rigidly united to the tractor at the rear end thereof, a pair of spaced sidebars having their front ends pivotally united to the draw-plate or bar at or near the rear corners thereof respectively, a crossbar longer than the draw-plate, having its ends pivotally united to the rear ends of the sidebars, and a tongue united to the trailer and pivotally united to the middle of the crossbar.

3. A hitch for coupling tractors and trailers, comprising a draw-plate or drawbar rigidly united to the tractor at the rear end thereof, a pair of spaced sidebars having their front ends pivotally united to the draw-plate or bar at or near the rear corners thereof respectively, a crossbar having its ends pivotally united to the rear ends of the sidebars, and a tongue united to the trailer and pivotally united to the middle of the crossbar with its front end slotted and arranged to embrace a pivot united to the draw-plate on its middle line.

4. A hitch for coupling tractors and trailers, comprising a draw-plate or drawbar rigidly united to the tractor and extending substantially to the rear of its rear axle, a pair of sidebars pivotally united at their front ends to the draw-plate or bar at opposite sides thereof, a crossbar having its ends pivotally united to the rear ends of the respective corresponding sidebars, a tongue united to the trailer and pivotally united to the crossbar.

5. A hitch for coupling tractors and trailers, comprising a draw-plate or drawbar rigidly united to the tractor and extending substantially to the rear of its rear axle, a pair of sidebars pivotally united at their front ends to the draw-plate or bar at opposite sides thereof, a crossbar having its ends pivotally united to the rear ends of the respective corresponding sidebars, and a tongue united to the trailer and pivotally united to the crossbar, the crossbar being substantially longer than the draw-plate so the sidebars spread outwardly toward the rear.

6. The combination with a tractor and a trailer of a coupling hitch comprising a draw-plate or drawbar rigidly united to the tractor at the rear end thereof, a pair of spaced sidebars with their front ends pivotally united to the draw-plate or bar, a crossbar having its ends pivotally united to the rear ends of the sidebars, and a tongue united to the trailer and pivotally united to the middle of the crossbar.

7. The combination with a tractor and a trailer, of a coupling hitch comprising a draw-plate or drawbar rigidly united to the tractor at the rear end thereof, a pair of spaced sidebars with their front ends pivotally united to the draw-plate or bar, a crossbar longer than the draw-plate, having its ends pivotally united to the rear ends of the sidebars, and a tongue united to the trailer and pivotally united to the middle of the crossbar.

8. The combination with a tractor and a trailer, of a coupling hitch comprising a draw-plate or drawbar rigidly united to the tractor at the rear end thereof, a pair of spaced sidebars with their front ends pivotally united to the draw-plate or bar, a crossbar having its ends pivotally united to the rear ends of the sidebars, and a tongue united to the trailer and pivotally united to the middle of the crossbar with its front end slotted and arranged to embrace a pivot united to the draw-plate on its middle line.

9. The combination with a tractor and a trailer, of a coupling hitch comprising a draw-plate or drawbar rigidly united to the tractor and extending substantially to the rear of its rear axle, a pair of sidebars pivotally united at their front ends to the draw-plate or bar at opposite sides thereof, a crossbar having its ends pivotally united to the rear ends of the respective corresponding sidebars, and a tongue united to the trailer and pivotally united to the crossbar.

10. The combination with a tractor and a trailer, of a coupling hitch comprising a draw-plate or drawbar rigidly united to the tractor and extending substantially to the rear of its rear axle, a pair of sidebars pivotally united at their front ends to the draw-plate or bar at opposite sides thereof, a crossbar having its ends pivotally united to the rear ends of the respective corresponding sidebars, and a tongue united to the trailer and pivotally united to the crossbar, the crossbar being substantially longer than the draw-plate so the sidebars spread outwardly toward the rear.

11. In a hitch for coupling tractors and trailers, the combination with a draw-plate or drawbar rigidly united to the tractor at the rear thereof, of a pair of spaced sidebars pivotally united to the draw-plate or bar near the rear corners thereof, a crossbar spaced from the draw-plate and having its ends pivotally united to the rear ends of the sidebars, and a tongue united to the trailer and pivotally united to the crossbar.

12. In a hitch for coupling tractors and trailers, the combination with a draw-plate or drawbar rigidly united to the tractor at the rear thereof, of a pair of spaced sidebars pivotally united to the draw-plate or bar near the rear corners thereof, a crossbar spaced from the draw-plate and having its ends pivotally united to the rear ends of the sidebars, and a tongue united to the trailer and pivotally united to the crossbar at or near the middle thereof.

13. In a hitch for coupling tractors and trailers, the combination with a draw-plate or drawbar rigidly united to the tractor at the rear thereof, of a pair of spaced sidebars pivotally united to the draw-plate or bar near the rear corners thereof, a crossbar spaced from the draw-plate and having its ends pivotally united to the rear ends of the sidebars, and a tongue united to the trailer and pivotally united to the crossbar and with its front end slotted and arranged to embrace a pivot united to the draw-plate on its middle line.

14. In a hitch for coupling tractors and trailers, the combination with a draw-plate or drawbar rigidly united to the tractor at the rear thereof, of a pair of spaced sidebars pivotally united to the draw-plate or bar near the rear corners thereof, a crossbar spaced from the draw-plate and having its ends pivotally united to the rear ends of the sidebars, and a tongue united to the trailer and pivotally united to the crossbar and with its front end slotted and arranged to embrace a pivot united to the draw plate.

15. In a hitch for coupling tractors and trailers, the combination with a draw plate or drawbar rigidly united to the tractor and extending substantially to the rear of its rear axle, of a pair of sidebars pivotally united at their front ends to the draw-plate or bar at opposite sides thereof, a crossbar having its ends pivotally united to the rear ends of the respective corresponding sidebars, and a tongue united to the trailer and pivotally united to the crossbar.

16. In a hitch for coupling tractors and trailers, the combination with a draw-plate or drawbar rigidly united to the tractor and extending substantially to the rear of its rear axle, of a pair of sidebars pivotally united at their front ends to the draw-plate or bar at opposite sides thereof, a crossbar having its ends pivotally united to the rear ends of the respective corresponding sidebars, a tongue united to the trailer and means to unite the tongue to the crossbar.

17. In a hitch for coupling tractors and trailers, the combination with a draw-plate or drawbar rigidly united to the tractor and extending substantially to the rear of its rear axle, of a pair of sidebars pivotally united at their front ends to the draw-plate or bar at opposite sides thereof, a crossbar having its ends pivotally united to the rear ends of the respective corresponding sidebars, a tongue united to the trailer and adjustable means to unite the tongue to the crossbar.

18. In a hitch for coupling tractors and trailers, the combination with a draw-plate or drawbar rigidly united to the tractor at the rear thereof, of a crossbar rigidly united to the draw-plate to the rear of the rear wheels of the tractor, a pair of spaced sidebars pivotally united at their front ends to the crossbar, a second crossbar pivoted to the rear ends of the sidebars, and a tongue united to the trailer and having its front end pivoted to the second crossbar.

19. A hitch as described in claim 18, the second crossbar being shorter than the other crossbar to facilitate clearing the wheels in turning.

CHARLES RUSSELL BINGHAM.